United States Patent [19]
Einbinder et al.

[11] Patent Number: 5,896,512
[45] Date of Patent: Apr. 20, 1999

[54] MODIFIED NETWORK INTERFACE UNIT WITH TERMINAL DEVICE ACCESS

[75] Inventors: Saul Joseph Einbinder, Holmdel; Michael Robert Lundberg, Middletown; Charles Timothy Martin, Aberdeen; Stephen George Pisano, Middletown, all of N.J.

[73] Assignee: Lucent Technologies Inc., Murray Hill, N.J.

[21] Appl. No.: 08/712,009

[22] Filed: Sep. 11, 1996

[51] Int. Cl.$^6$ .............................. G06F 17/00; G06F 13/00
[52] U.S. Cl. .................... 395/200.8; 395/200.56; 395/284; 395/200.83; 395/200; 395/52
[58] Field of Search ........................ 395/200.02, 800, 395/200, 182.1, 182.12; 375/357

[56] References Cited

U.S. PATENT DOCUMENTS

| | | | |
|---|---|---|---|
| 5,299,314 | 3/1994 | Gates | 395/200 |
| 5,448,635 | 9/1995 | Biehl et al. | 379/399 |
| 5,530,894 | 6/1996 | Farrell et al. | 395/800 |
| 5,727,168 | 3/1998 | Inoue et al. | 395/282 |

OTHER PUBLICATIONS

*ISDN Explained*, Wiley & Sons Ltd, Griffiths Mar. 1995 p. 66.

*Primary Examiner*—Glenton B. Burgess
*Assistant Examiner*—Chris Tanner

[57] ABSTRACT

An interface unit for interfacing a computer device and a telecommunications terminal device such, for example, as a telephone, with a data network capable of carrying data associated with each type of device. The interface unit is powered independently from the computer device and includes both the processing and memory resources needed to interact with the network and an interface for establishing a link to the telecommunications terminal.

8 Claims, 3 Drawing Sheets

MODIFIED NETWORK INTERFACE UNIT WITH TERMINAL DEVICE ACCESS

BACKGROUND OF THE INVENTION

I. Technical Field of the Invention

This invention relates generally to communications networks and, more particularly, to a system and method for establishing a reliable communications link between a personal computer or workstation and such networks.

II. Description of the Related Art

Network interface cards (NIC) are widely used for connecting computer devices to a data network to facilitate the exchange of data therebetween. Most data networks provide for bi-directional data transmission wherein data is transmitted in an upstream direction from a computer to the network where the data is received by a receiving device also connected to the network, and in a downstream direction wherein data is received from the network by a destination device, e.g. a personal computer or the like. As is widely known, such networks require that the data signals carried thereby adhere to a specific data format or protocol recognized by the network. Thus, existing NICs convert upstream computer data to the appropriate protocol for the network before the data is transmitted. Likewise, conversion of the downstream data from the network protocol to a format recognized by the destination computer device is performed by the NIC.

Most computers provide I/O ports for controlling various peripherals. While such peripherals typically include printers, they may also include non-computer or telecommunications terminal devices, such as analog or digital telephones, videophones, facsimile machines, answering machines, computer data and/or fax modems, and adjunct devices such as caller-ID, which communicate with like devices on a telephone communications network that is separate from the computer data network. In addition, internet "telephones" now exist in the form of software that allows a user to speak into a handset, for example, which is connected to a sound card in a CPU of a computer for transmission of the spoken data on or over the data network or internet. While such a configuration allows the internet telephone to transmit data through the computer data network, the dependency of such devices on the CPU creates several drawbacks. For example, if the CPU is engaged in other operations or calculations during the use of the internet telephone, the perceived quality of the telephone call may decrease. During use of the internet telephone, conversely, fewer processing resources of the CPU are made available to other applications.

As will be readily appreciated by those skilled in the art, interruptions in the operation of the computer or workstation are inevitable. These may result, for example, from power disruptions, software operating system faults (i.e. "hanging") or hardware failures such as, for example, hard drive failures or memory errors, system resets and reboots initiated by the user. Where the network connection to the telephonic device depends upon the processing and power resources of the personal computer or workstation, any of the aforementioned interruptions will disrupt the flow of data between the telecommunications terminal and the computer network.

Accordingly, there exists a need for a network interface card or adjunct module which can reliably allow at least one telecommunications terminal to interact, via a single connection, with a common network that carries both computer data and telecommunications traffic.

SUMMARY OF THE INVENTION

The aforementioned deficiencies are addressed and an improvement is made in the art by the provision of an interface unit for interfacing a computer device and a telecommunications terminal device such, for example, as a telephone, with a data network capable of carrying data associated with each type of device. According to the present invention, the interface unit is powered independently from the computer device and includes both the processing and memory resources needed to interact with the network and an interface for establishing a link to the telecommunications terminal.

As will be readily appreciated by those skilled in the art, a network typically employs particular protocols and procedures which allow the flow of data between its end points or nodes. According to the present invention, the processing and memory resources of the interface unit are configured to comply with the protocols and procedures without any assistance from the computer sharing the network connection. As such, operation of the interface unit is not affected by interruptions in the processing ability of the computer.

In accordance with an illustrative embodiment of the present invention, the interface unit comprises a network interface card (NIC) that may be inserted into a computer or workstation, as for example, by plugging it into an VESA, PCI, or SBUS bus thereof. As is typical in the art, the NIC may be powered via its connection to any of the aforementioned bus architectures. According to the present invention, power may alternatively be supplied by a source independent of the computer to thereby ensure reliable operation of the NIC. By way of illustrative example, the independent power source may comprise a separate, plug-in power supply for attachment to a standard duplex receptacle, an on-board rechargeable battery, or the −48 V DC power supply typically employed in a public or private telephone system.

In a modified embodiment, the interface unit is configured as an adjunct device between the computer and the network. Connection between the interface unit and the computer may be achieved in a conventional manner, for example, by an interface card having appropriate terminal connections, by a serial or parallel port of the computer, or by an existing network interface card in the computer. In this case, power is not necessarily derived from the computer but more likely from an independent source as described above.

Connection of an interface unit constructed in accordance with the present invention to the telecommunications terminal may be achieved in any desired manner. Illustratively, the interface unit may be configured with a standard analog telephone interface port, a digital ISDN BRI interface port, a proprietary analog or digital telephone interface, a wireless or cordless communication link, an optical fiber link, a telephone adapter designed to connect to a computer serial or parallel port, or any other suitable configuration.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
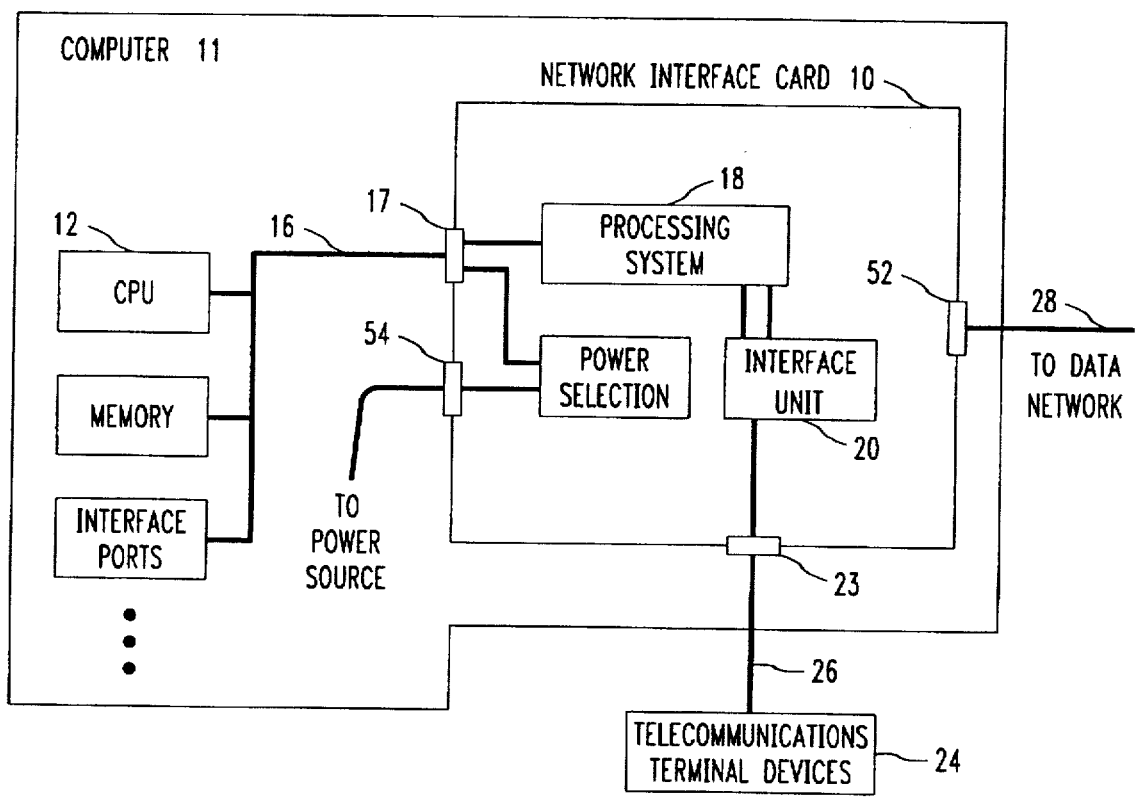
FIG. 1 is a block diagram of a CPU and telephonic-type terminal devices interfaced with a modified NIC in accordance with the present invention.

Referring now to the drawings, and initially to FIG. 1 thereof, a block representation of a network interface between a data network and various terminal devices is there depicted. In the illustrative embodiment of FIG. 1, the network interface unit is configured as a network interface card (NIC) 10 driven by software executing on a central processing unit (CPU) 12 of a personal computer 11 or the like to which the NIC is connected. The CPU 12 is connected to the NIC 10 via a connection line 16 connected to port 17. Line 16 may be, for example, a PCI bus, VESA bus, ISA bus, SBUS, or other bus of a computer or workstation as is known in the art. As described more fully below, NIC 10 contains or includes a processing system 18 for providing the CPU 12 as well as telephonic-type terminal devices 24 access to a data network on a fiber, wire, or wireless connection 28 through an NIC output port 52.

With continued reference to FIG. 1, NIC 10 includes a terminal device downstream port 23 to which a plurality of telephonic-type terminal devices 24 are connected. Such telephonic-type devices may include, by way of example, telephones, video phones, facsimile machines, etc. The terminal devices 24 are connected via telephone lines 26 to the downstream port 23. As is known in the art, telephone lines 26 may be, for example, standard analog telephone link, ISDN lines, a proprietary telephonic interface, or a wireless interface. In general, the telephone device may be connected via any appropriate telecommunications link as is known in the art. Additionally, the telephone device may be connected indirectly via first connection to a telephonic interface unit, such unit then being connected to the NIC 10 via a telephonic communications link, such as a TDM bus.

As is known in the art, a computer contains a power conversion unit that supplies power to the computer's components. This power is distributed via various means, including distribution as part of the computer's internal bus 16. The NIC 10 may derive power from this bus. In addition, the NIC 10 also includes a power terminal 54 for receiving electrical power from a source that is independent of the power supplied by the power conversion unit in the computer 11, and also independent of the source providing power to the computer's power conversion unit. This external source may, by way of illustrative example, comprise a separate, plug-in power supply for attachment to a standard duplex receptacle, an on-board rechargeable battery, or the −48V DC power supply typically employed in a public or private telephone system. The power selection and conversion unit 60 receives power from either or both of link 16 and terminal 54, and distributes the required power to the components of the NIC 10, and to the terminal devices 24.

Figure 2:
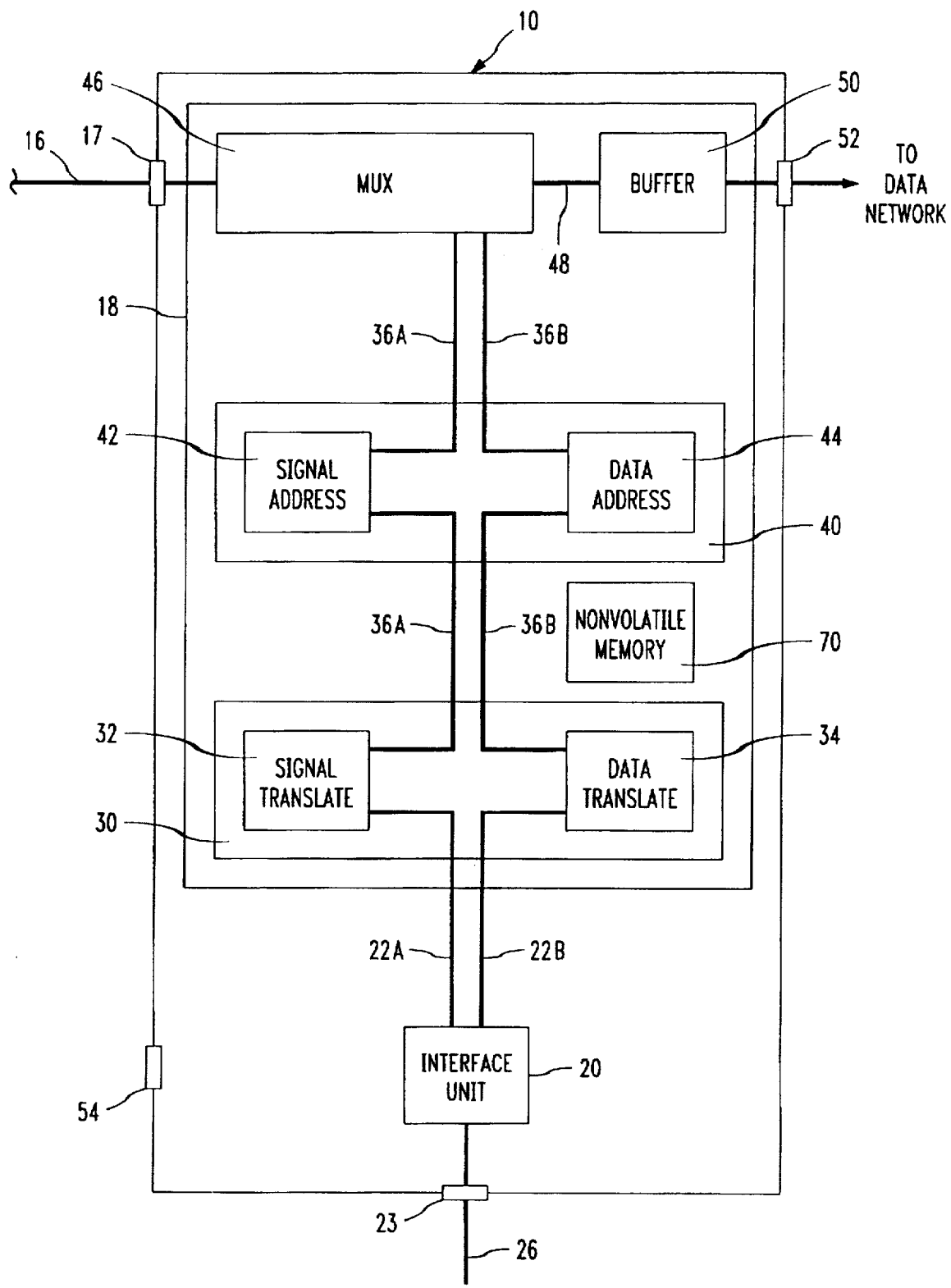
FIG. 2 is a detailed block representation of the processing system of FIG. 1.

With reference now to FIG. 2, a detailed block diagram of the processing system 18 incorporated in the modified NIC 10 is there shown. The processing system 18 includes a translation unit 30 which communicates with telephonic-type terminal devices by exchanging information through the terminal device data interface 22. The translator unit 30 converts or re-formats the telephonic-type terminal device data to the protocol required by the data network, and also converts in the reverse direction, i.e. from the data network protocol to the terminal device protocol. This facilitates transmission of telephonic data through a computer network without requiring the provision or presence of a separate telephone network, i.e. without the need for additional and/or duplicative wiring. As is known in the art, telecommunications terminal devices exchange both telephonic data and signaling information with the telecommunications network to which they are attached. Thus, the signaling information and the telephonic data are separated by the interface unit 20, and translated respectively by the signal translator 32 and the data translator 34. The interface unit 20 exchanges signaling information with the signal translator 32 via bus 22a, and it exchanges data (also known in the art as bearer) with the data translator 34 via bus 22b.

As is also known in the art, the signaling information is typically exchanged between the terminal device and a telecommunications system controller located somewhere in the telecommunications network. When connecting a terminal device to a data network capable of carrying telecommunications data, the signaling information and the telephonic data must be sent to destination addresses that are consistent with the design of the data network. With continued reference to FIG. 2, the processing system 18 must contain an initial data network address of the telecommunications system controller, or some similar entity connected to the data network, in order to establish communications with it. Accordingly, the processing system 18 contains an initial address of said controller. This address may be programmed into a non-volatile memory 70 at the time of manufacture of the NIC 10, or at the time the NIC 10 is installed. Subsequently, each time power is applied to the NIC 10, the processing system 18 can use the initial address stored in the non-volatile memory 70 to automatically establish communications without any reliance upon information contained in the computer attached at port 17. After the NIC 10 establishes communication with a telecommunications system controller as described, the NIC 10 may receive further information from said controller instructing as to the destination addresses of the signaling information and the telephonic data that it is to transmit using the data network. Accordingly, an address unit 40 is provided which receives the translated data from the translation unit 30 via an internal bus 36. The address unit 40 adds the destination addresses of the destination or receiving devices via a signaling address unit 42 and a telephonic data address unit 44.

Once the terminal device data is translated and the addresses of the destination devices have been determined, the data is provided to a multiplexer—demultiplexer (MUX) unit 46, which may be software or hardware driven, for combining the reformatted terminal device data with outgoing data generated by the CPU 12. The combined data is then output for transmission on the data network. In other words, as the formats for the CPU data and terminal device data have now been made consistent with each other and with the format required by the data network, the separate data signals can be multiplexed by MUX 46, in a manner well-known to those having ordinary skill in the art, for output via NIC output port 52 to downstream CPUs and terminal devices (not shown) that are also connected to the data network. In a preferred embodiment, a buffer 50 is included between the NIC output port 52 and the MUX 46 for receiving the multiplexed data from line 48 and for regulating the bit flow rate of data to and from the data network.

As explained above, the NIC 10 functions in a bi-directional manner. Thus, it is not only capable of outputting multiplexed data for transmission to the data network, but is also capable of receiving multiplexed data and forwarding the received data to either or both the CPU 12 and the terminal devices 24. Such incoming data is processed in a reverse order relative to that described above. For example, and with continued reference to FIG. 2, incoming data is first received by buffer 50 and is then provided to MUX 46 for processing and separation. MUX 46 will separate the CPU destination data from the terminal device destination data. The CPU destination data will be output via port 17 to data bus line 16 for receipt by CPU 12. The terminal device data will be converted from the data network format to the format required by the terminal devices, via translation unit 30 and output from terminal device downstream port 23 for reception by the intended terminal device.

The interface unit 20 which, as explained above, interfaces or connects the telephone-type terminal devices 24 with the translation unit 30, also functions to convert the data generated and/or received by the terminal devices 24 to a format required by the translation unit 30. For example, the telephonic data may be converted to a proper line format such as ISDN wherein the data is divided into a signaling channel and bearer channels. In addition to the reformatting and separation functions described above, interface unit 20 may also perform analog to digital conversion functions for use, for example, if analog terminal devices are employed.

Figure 3:
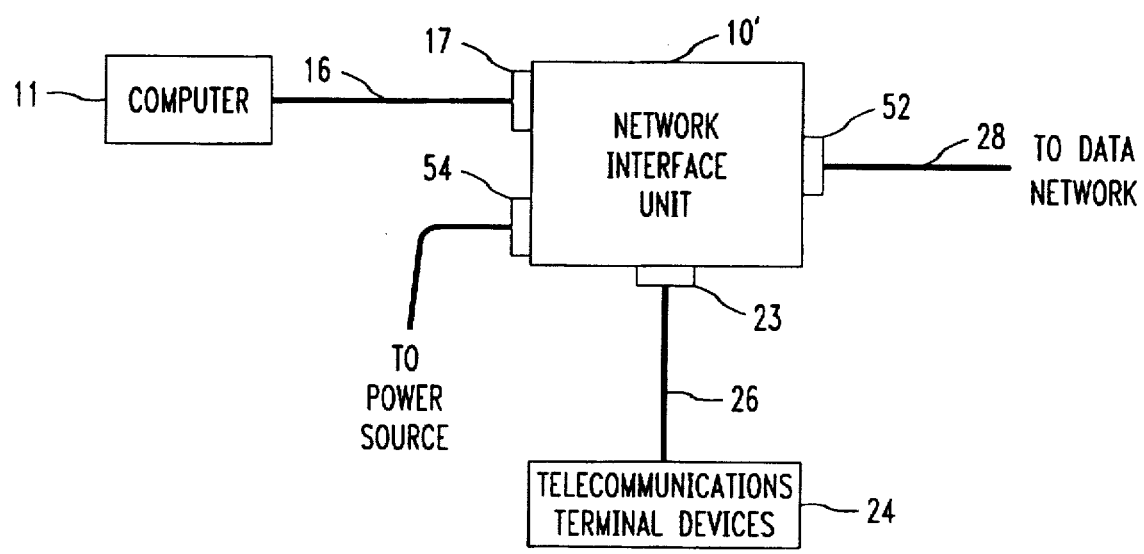
FIG. 3 is a block diagram of an alternate embodiment of the network interface unit in accordance with the present invention.

As an alternative embodiment, a network interface unit 10' can be placed externally or outside of or separate from computer 11. Such a configuration is depicted in FIG. 3. As shown, the network interface unit 10' has first and second downstream ports 17, 23 for connection to the computer 11 and the terminal devices 24, respectively. An upstream port 52 provides access to the data network for the computer 11 and the terminal devices 24. As in known in the art, the downstream port 17 may connect to various appropriately configured interfaces of a computer, such as a network interface card, a parallel or serial interface, or a wireless interface. A power terminal 54 is included for receiving electrical power from a source that is independent of the power supplied by the power conversion unit in the computer 11, and also independent of the source providing power to the computer's power conversion unit.

The modified network interface card 10 as described hereinabove or in the alternative embodiment as the network interface unit 10' of FIG. 3 provide for continuous and uninterrupted terminal device use without dependence on the computer. In other words, the terminal devices 24 are no longer dependent on the computer, or on components or programs or algorithms or information in the computer 11, for access to the data network. Moreover, as the NIC 10 and the network interface unit 10' are provided with a separate power terminal 54 for receiving power from a source independent of the switched or other source providing power to the computer, in the event of a power failure to or intentional powering down of the computer 11, the terminal devices 24 will still receive power and, thus, will be able to continue to access the data network and to be accessed therethrough. Conversely, the use of terminal devices 24 will not adversely affect the transmission and/or reception of data by the computer to and from the data network. In addition, the processing system 18 not only provides access to the data network for the CPU 12 and the terminal devices 24, but also provides a communication path between these devices. Accordingly, CPU 12 can still be used as desired, to control the terminal devices 24.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and which perform substantially the same function in substantially the same way to achieve the same results are within the scope of the invention. It is the intention, therefore, to be limited only as indicated by the scope of the claims appended hereto.

What is claimed is:

1. A network interface unit for interfacing a computer device and a telecommunications terminal device with a node of a data network in which both computer data and telecommunications data are carried, said interface unit comprising:

a first interface connectable to a node of the data network;

a second interface connectable to a computer to thereby establish a communication link between the data network node and the computer;

a third interface connectable to the terminal device to thereby establish a communication link between the data network node and the terminal device;

a processing system operable to interact with the data network to thereby establish communication between the data network and at least one of the computer and a data network endpoint for communication with the terminal device, said processing system being operable to modify information received from the terminal device to comply with procedures and protocols of the data network; and a power terminal for supplying power to said unit from a source independent of operating power supplied to the computer, to thereby allow continued operation of the unit and continued communication between the terminal device and the data network irrespective of an operating state of the computer;

wherein the data network endpoint includes an assigned address and wherein said processing system includes a non-volatile memory containing an initial destination address of a telecommunications system controller for allowing information translated from the terminal device to be sent to the telecommunications system controller irrespective of the operating state of the computer.

2. The interface unit of claim 1, wherein said interface unit is a network interface card internally connectable to a bus of the computer.

3. The interface unit of claim 1, wherein said interface unit is configured as an adjunct device externally connectable to the computer.

4. The interface unit of claim 1, wherein information being sent to the data network from the terminal device is in a first format acceptable by the terminal device but different than a second format required by the data network and wherein said processing system is operable to reformat signals to the second format for transmission through the data network and to reformat signals intended for the terminal device and received by the data network into the first format.

5. The interface unit of claim 4, wherein data generated by the terminal device comprises a signaling portion, for the purpose of setting up a telecommunication connection to a another terminal device, and a data portion containing information to be exchanged using over the telecommunication connection, said processing system being further operable to reformat each respective portion in accordance with required formats of the data network.

6. The interface unit of claim 1, wherein said processing system further comprises a buffer register for regulating the flow of data exchanged between the data network and at least one of the computer device and the terminal device.

7. The interface unit of claim 1, wherein said processing system includes a non-volatile memory containing executable program instructions and data relating to the protocols and procedures of the data network.

8. The interface unit of claim 1, wherein the third interface is connectable to multiple terminal devices to thereby establish a communications link between the data network and the terminal devices.

* * * * *